United States Patent Office  3,058,031
Patented Oct. 9, 1962

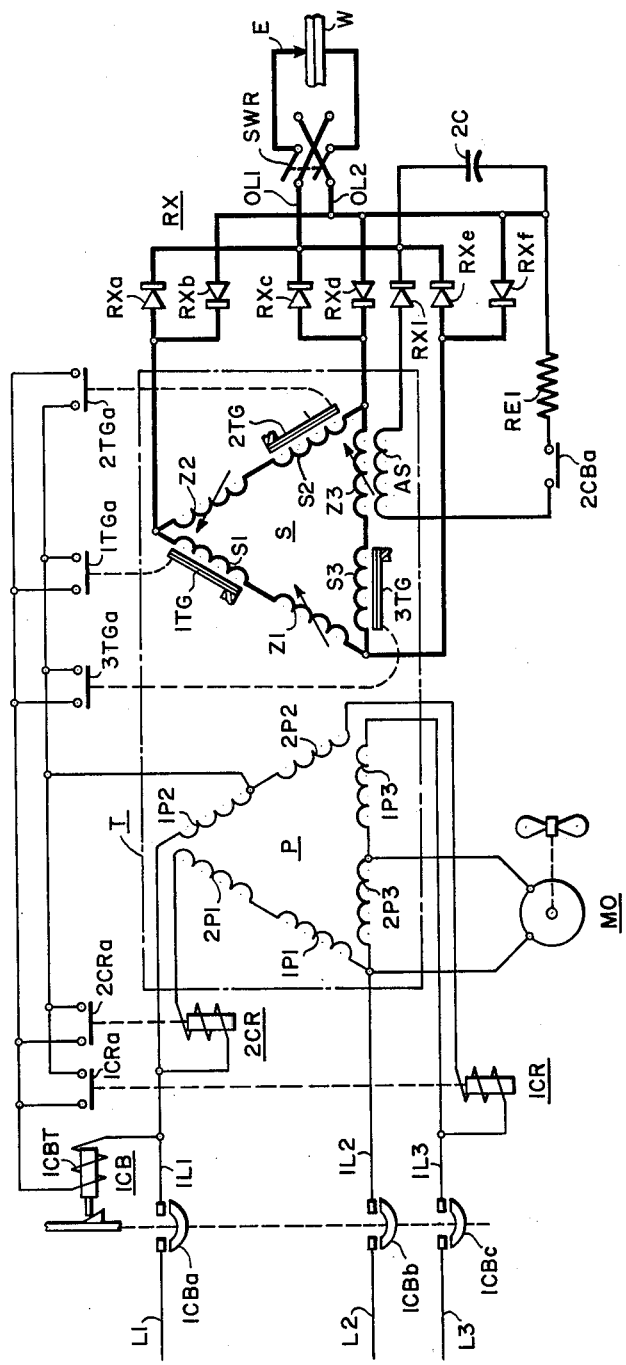

3,058,031
ARC WELDING APPARATUS
Emil F. Steinert, Martin Rebuffoni, and Lewis F. Pettit, Jr., Williamsville, and Gordon E. Cossaboom, Orchard Park, N.Y., assignors to Westinghouse Electric Corporation, East Pittsburgh, Pa., a corporation of Pennsylvania
Filed Dec. 17, 1959, Ser. No. 860,176
10 Claims. (Cl. 315—139)

This invention relates to the arc-welding art and has particular relationship to arc-welding apparatus of the static direct-current type in which rectification is effected by rectifiers of the silicon-diode type. The expression "rectifiers of the silicon-diode type" as used herein means rectifiers made up of low-loss low-forward-resistance, high-back-resistance diodes which may be composed of silicon, germanium or like materials. The reference to arc-welding herein includes within its scope, to the extent that it is applicable, arc-melting, surfacing, or cutting and like processes.

In the use of direct-current static arc-welding apparatus including silicon-type diode rectifiers excessive failures of the diodes have been experienced. In the addition, failure of the transformer has been experienced. Such failures occurred particularly in the so-called variable-voltage constant-current apparatus in which the welding transformer is of the high impedance type or is connected to the rectifier through high impedances. It is an object of this invention to eliminate these difficulties.

It is a further object of this invention to provide direct-current static arc-welding apparatus, including a rectifier of the silicon-diode type in the use of which the failures of diodes shall be minimized, and it is an additional object of this invention to provide such apparatus particularly of the constant-current variable-voltage type in the use of which the failure of the welding transformer shall be eliminated.

This invention arises from the discovery that the excessive failure of diodes in prior art apparatus results principally from the short-circuiting of one of the diodes of the rectifier. The short-circuiting of one diode in such apparatus produces an overload which in its short-time effect is not distinguishable from the overloads produced by short circuits of the electrode to the work during welding. The absence of a marked response to the short-circuiting of a diode occurs particularly in constant-current welders where the impedance of the welding transformer or the impedance in its circuit limits the effect of a short circuit whether it be of a diode or of the electrode to the work. The apparatus then continues to operate over-loaded, and the other diodes and the transformers are damaged. There are thermal elements in each of the windings of the transformer, but it has been found that these do not afford adequate protection in many cases.

In accordance with this invention overload relays of the inverse-time type are connected to the welding transformer in such a way as to cause the supply of power to be interrupted if an overload of a predetermined magnitude persists for a time interval of predetermined duration, the duration being inversely dependent on the magnitude. Each of the relays may be similar to the relay 1CR shown in FIG. 1 of application Serial No. 812,547, filed May 11, 1959, to Emil F. Steinert and Martin Rebuffoni for Power Supply Apparatus. Where the supply is of the polyphase type, there should be a sufficient number of relays to interrupt the supply of power to the transformer on the occurrence of an overload between any two phase conductors of the supply. The relays should be so selected as to interrupt the supply of power only on the occurrence of a persistant overload in any phase and not during normal welding at the highest welding-current rating of the apparatus. Thus, the repeated short circuits of the electrode to the work which occurs during normal arc welding should not cause the overload relays to interrupt the supply of power to the transformer but a short-circuited diode would.

An important feature of this invention is the connection of the overload relays in the primary of the welding transformer. In this case the relays are affected not only by the direct overload but also by the saturation produced in the transformer core by the unbalanced current which flows through the secondary when a diode is short-circuited. This unbalanced current has a direct-current component which saturates the core and greatly increases the magnitude of the exciting current in the primary. This assures effective operation of the relays.

The novel features considered characteristic of this invention are disclosed generally above. The invention itself both as to its organization and as to its method of operation together with additional objects and advantages thereof will be understood in detail from the following description of a specific embodiment taken in connection with the accompanying drawing in which the single figure is a schematic showing a preferred embodiment of this invention.

The apparatus shown in the drawing is a welding power supply unit for supplying power for arc welding between an electrode E and work W. The unit is energized through supply conductors 1L1, 1L2, and 1L3 which are adapted to be connected to the buses L1, L2, L3 of a commercial three-phase supply, usually of the 220 or 440-volt type, through the contacts 1CBa, 1CBb, 1CBc of a circuit breaker 1CB. The breaker 1CB has a trip coil 1CBT.

The apparatus includes a polyphase transformer T having a primary P, a secondary S and an auxiliary secondary AS. The primary P includes three sets of windings 1P1, 2P1; 1P2, 2P2; and 1P3, 2P3, which are adapted to be connected in series when the supply is of the 440-volt type and in parallel when the supply is of the 220-volt type. The secondary S includes windings S1, S2, S3.

The apparatus also includes inverse-time overload relays 1CR and 2CR of the type described above having front contacts 1CRa and 2CRa, respectively. The set of windings 1P1 and 2P1 is adapted to be energized from conductors 1L1 and 1L2 through the coil of 2CR. The coil of 2CR thus draws current dependent on the loading of phases L1 and L2. The set of windings 1P2 and 2P2 are similarly adapted to be energized from 1L1 and 1L3 through the coil of 1CR. The windings 1P3 and 2P3 are adapted to be energized directly from 1L2 and 1L3.

The apparatus also includes a plurality of impedances Z1, Z2, Z3. The impedances Z1, Z2, Z3 and the secondary windings S1, S2, S3 are connected in a delta network. The secondary S and reactors Z1, Z2, Z3 are preferably combined into a secondary-reactor as disclosed in Patent 2,957,118, granted October 18, 1960, to Emil F. Steinert, Harry J. Bichsel and Ray Verne Lester for Electric Arc Welders.

A rectifier RX made up of diodes RXa, RXb, RXc, RXd, RXe, RXf of the silicon type is connected in full wave rectifying relationship with the secondary delta network. Thermal protective devices 1TG, 2TG, and 3TG having contacts 1TGa, 2TGa, 3TGa are imbedded in each of the secondaries S1, S2, S3.

The rectifier RX supplies direct-current potential to output conductors OL1 and OL2. Conductors OL1 and OL2 are adapted to be connected to electrode E and work W in either polarity through a reversing switch SWR. To suppress surges a capacitor 2C is connected between conductors OL1 and OL2.

Arc drive is derived from secondary AS which is coupled to one of the reactors Z1, Z2, Z3 and connected across OL1 and OL2 through silicon diode RX1, resistor RE1 and circuit breaker contacts 2CBa as disclosed in Patent 2,965,805, granted December 20, 1960, to Emil F. Steinert for Arc Welding Apparatus.

The trip coil 1CBT of the breaker 1CB is adapted to be connected across winding 1P2 through any one of contacts 1CRa, 2CRa, 1TGa, 2TGa, 3TGa. Actuation of any one of these contacts then trips the circuit breaker 1CB. A fan motor MO is connected across winding 2P3.

In the use of the apparatus, an arc between E and W is supplied from conductors OL1 and OL2 through SW3. Following the procedure outlined in the above-identified Steinert-Rebuffoni application, Serial No. 812,547, the relays 1CR and 2CR are so selected that during normal welding, even at the highest welding-current setting of the apparatus, these relays remain unactuated and the circuit breaker 1CB remains closed, but for a persistent overload even of a small magnitude, one or both of these relays is actuated. In a typical case, diode RXc might become short-circuited. In this case current circulates through RXa, RXc, S2, Z2 and through RXe, RXc, S3, Z3. This current has a direct-current component, which tends to saturate the core. Relay 1CR is then actuated in a predetermined time interval depending on the overload through RXa, RXc, S2, Z3 energizing 1CBT to open the circuit breaker 1CB. This time interval is such that the diodes other than RXc and the transformer T are not damaged. The saturation of the transformer core by the unbalanced current which flows in this core renders the relay 1CR highly effective in performing its function by producing a large increase in the exciting current which adds to the overload.

While a preferred embodiment of this invention has been disclosed herein, many modifications thereof are feasible. For example, the impedance of the transformer T might be made of the desired magnitude by proper dimensioning of the windings or core, or the reactances might be connected in the primary circuit. Because the transformer T is usually of the high step-down type, the current through the primary P is relatively small and the relays 1CR and 2CR operate with high precision when their coils are connected in the primary P as shown. In addition, advantage is taken of the saturation of the core. This is an important feature of this invention in its specific aspects. But in accordance with the broader aspects of this invention, the relays 1CR and 2CR could be connected in the secondary circuit 1.

This invention then is not to be restricted except in so far as is necessitated by the spirit of the prior art.

We claim as our invention:

1. Arc-welding apparatus for welding work with an electrode including means for supplying polyphase power having $n$ phases, a first plurality of $n$ sets of windings, a second plurality of $n$ sets of windings, first means connecting the sets of windings of said first plurality in a first network corresponding to said supply means, second means connecting the sets of windings of said second plurality in a second network corresponding to said supply means, $n-1$ overload relays each having coil means and contact means, said relays being of the inverse-time type so that the contact means of each relay is actuated for an overload of a predetermined magnitude only if said overload persists for a time interval of a duration which is inversely dependent on said magnitude, said $n-1$ coil means being connected in one of said networks, each coil means to conduct current dependent on the current conducted by a different one of the sets of windings of said one network, means connecting said supply means in polyphase power transfer relationship with said first network, means coupling said networks in magnetic inductive relationship, rectifier means of the silicon-diode type, means connecting said rectifier means in rectifying relationship with said second network, means connecting said rectifier means in direct-current power transfer relationship with said electrode and work, the relationship between said magnitude of said overload and said duration being such that any of said relays is actuated only on the occurrence of a persistent overload and not during normal welding at the maximum welding-current rating of said apparatus, circuit interrupting means connected to said supply means when actuated for interrupting the supply of power to said first network by said supply means, and means connecting said contact means to said interrupting means so that on actuation of said contact means said interrupting means is actuated.

2. Arc-welding apparatus for welding work with an electrode from a three-phase power supply including a polyphase transformer having a primary having three sets of windings and a secondary having three sets of windings, first and second overload relay means, each of said relay means having coil means and contact means and being of the inverse-time type so that said contact means of each of said relay means is actuated for an overload of a predetermined magnitude through said coil means only if said overload persists for a predetermined interval having a duration inversely dependent on said magnitude, means including said coil means for connecting said windings of said primary in a delta network with each said coil means connected between different sets of said last-named windings, means connected to said network for connecting said supply means in power supply relationship with said network, one of the phases of said supply means being connected to supply in series, one of said sets of windings of said primary and the coil means of said first relay means and another of the phases of said supply means being connected to supply in series another of said sets of windings of said primary and said coil means of said second relay means, means connecting said secondary in a delta network, rectifier means of the silicon-diode type, means connecting said rectifier means in power rectifying relationship with said last-named network, the relationship between said magnitude of said overload of each said relay means and said duration being such that any of said relay means is actuated only on the occurrence of a persistent overload and not during normal welding at the maximum welding-current rating of said apparatus, means connecting said network in D.C. power-supply relationship with said electrode and work, and means connected to said contact means for interrupting the supply of power to said rectifier means on actuation of either of said contact means.

3. Arc-welding apparatus for welding work with an electrode from a three-phase power supply including a polyphase transformer having a primary having three sets of windings and a secondary having three sets of windings, first and second overload relay means, each of said relay means having coil means and contact means and being of the inverse-time type so that said contact means of each of said relay means is actuated for an overload of a predetermined magnitude through said coil means only if said overload persists for a predetermined interval having a duration inversely dependent on said magnitude, means including said coil means for connecting said windings of said primary in a polyphase network with the coil means of said first relay means connected to a first set of windings of said primary and the coil means of said second relay means connected to a second set of windings of said primary, means connected to said network for connecting said supply means in power supply relationship with said network, one of the phases of said supply means being connected to supply said first set and said coil means connected thereto with said last-named coil means conducting current dependent on the current conducted by said first set and another of the phases of said supply means being connected to supply said second set and said coil means connected thereto, with said last-named coil means conducting current dependent on the current conducted by said second set, means connecting said secondary in a polyphase network corresponding to the network of said primary, rectifier means of the silicon-diode type, means connecting said rectifier means in power rectifying relationship with said last-named network, the relationship between said magnitude of said overload of each said relay means and said duration being such that any of said relay means is actuated only on the occurrence of a persistent overload and not during normal welding at the maximum welding-current rating of said apparatus, means connecting said network in D.C. power-supply relationship with said electrode and work, and means connected to said contact means for interrupting the supply of power to said rectifier means on actuation of either of said contact means.

4. Arc-welding apparatus for welding work from an electrode with power supplied from a polyphase power-supply means including a voltage step-down welding transformer having primary means and secondary means, impedance means, rectifier means of the silicon-diode type, means including said impedance means for connecting said rectifier means in rectifying relationship with said secondary means, means connected to said rectifier means for connecting said rectifier means in D.C. power-supply relationship between said electrode and said work, said impedance means reducing the magnitude of the current through said rectifier means on the occurrence of a short-circuit of one of the diodes of said rectifier means or on the short-circuit of said electrode to said work, overload relay means having coil means and contact means, means connected to said primary means and including said coil means for connecting said power-supply means in a power transfer circuit with said primary means, said coil means being connected in said circuit so that said contact means is actuated on the persistence in any one of the phases of said supply of overload of a predetermined magnitude for a predetermined duration, said duration being inversely dependent on said magnitude, circuit interrupting means, means connected to said interrupting means for connecting said interrupting means to said supply means when actuated to interrupt the supply of power to said primary means, and means connecting said contact means to said interrupting means to actuate said interrupting means on actuation of said contact means, the relationship between said magnitude and said duration being such that said contact means is actuated only on the occurrence of a persistent overload and not during normal welding at the highest current rating of said apparatus.

5. Arc-welding apparatus for welding work from an electrode with power supplied from a polyphase power-supply means including a voltage step-down welding transformer having primary means and secondary means, impedance means, means connecting said impedance means in voltage absorbing relationship with said transformer to absorb a portion of the voltage derivable therefrom, rectifier means of the silicon-diode type, means for connecting said rectifier means in rectifying relationship with said secondary means, means connected to said rectifier means for connecting said rectifier means in D.C. power-supply relationship between said electrode and said work, said impedance means reducing the magnitude of the current through said rectifier means on the occurrence of a short-circuit of one of the diodes of said rectifier means or on the short-circuit of said electrode to said work, overload relay means having coil means and contact means, means connected to said primary means and including said coil means for connecting said power-supply means in a power transfer circuit with said primary means, said coil means being connected in said circuit so that said contact means is actuated on the persistence in any one of the phases of said supply of overload of a predetermined magnitude for a predetermined duration, said duration being inversely dependent on said magnitude, circuit interrupting means, means connected to said interrupting means for connecting said interrupting means to said supply means when actuated to interrupt the supply of power to said primary means, and means connecting said contact means to said interrupting means to actuate said interrupting means on actuation of said contact means, the relationship between said magnitude and said duration being such that said contact means is actuated only on the occurrence of a persistent overload and not during normal welding at the highest current rating of said apparatus.

6. Arc-welding apparatus for welding work from an electrode with power supplied from a polyphase power-supply means including a voltage step-down welding transformer means having primary means and secondary means, said transformer means being of the relatively high impedance type, rectifier means of the silicon-diode type, means for connecting said rectifier means in rectifying relationship with said secondary means, means connected to said rectifier means for connecting said rectifier means in D.C. power-supply relationship between said electrode and said work, said transformer means because of said relatively high impedance reducing the magnitude of the current through said rectifier means on the occurrence of a short-circuit of one of the diodes of said rectifier means or on the short-circuit of said electrode to said work, overload relay means having coil means and contact means, means connected to said primary means and including said coil means for connecting said power-supply means in a power transfer circuit with said primary means, said coil means being connected in said circuit so that said contact means is actuated on the persistence in any one of the phases of said supply of overload of a predetermined magnitude for a predetermined duration, said duration being inversely dependent on said magnitude, circuit interrupting means, means connected to said interrupting means for connecting said interrupting means to said supply means when actuated to interrupt the supply of power to said primary means, and means connecting said contact means to said interrupting means to actuate said interrupting means on actuation of said contact means, the relationship between said magnitude and said duration being such that said contact means is actuated only on the occurrence of a persistent overload and not during normal welding at the highest current rating of said apparatus.

7. Arc-welding apparatus for welding work from an electrode with power supplied from a polyphase power-supply means including a voltage welding transformer means having primary means and secondary means, said transformer means being of the relatively high impedance type, rectifier means of the silicon-diode type, means for connecting said rectifier means in rectifying relationship with said secondary means, means connected to said rectifier means for connecting said rectifier means in D.C. power-supply relationship between said electrode and said work, said transformer means because of said relatively high impedance reducing the magnitude of the current through said rectifier means on the occurrence of a short-circuit of one of the diodes of said rectifier means or on the short-circuit of said electrode to said work, overload relay means having coil means and contact means, means connected to said primary means and including said coil means for connecting said power-supply means in a power transfer circuit with said primary means, said coil means being connected in said circuit so that said contact means is actuated on the persistence in any one of the phases of said supply of overload of a predetermined magnitude for a predetermined duration, said duration being inversely dependent on said magnitude, circuit interrupting means, means connected to said interrupting means for connecting said interrupting means to said supply means when actuated to interrupt the supply of power to said primary means, and means connecting said contact means to said interrupting means to actuate said interrupting means on actuation of said contact means, the relationship between said magnitude and said duration being such that said contact means is actuated only on the occurrence of a persistent overload and not during normal welding at the highest current rating of said apparatus.

8. Arc-welding apparatus for welding work from an electrode with power supplied from a power-supply means including a voltage welding transformer means having primary means and secondary means, said transformer means being of the relatively high impedance type, rectifier means of the silicon-diode type, means for connecting said rectifier means in rectifying relationship with said secondary means, means connected to said rectifier means for connecting said rectifier means in D.C. power-supply relationship between said electrode and said work, said transformer means because of said relatively high impedance reducing the magnitude of the current through said rectifier means on the occurrence of a short-circuit of one of the diodes of said rectifier means or on the short-circuit of said electrode to said work, overload relay means having coil means and contact means, means connected to said primary means and including said coil means for connecting said power-supply means in a power transfer circuit with said primary means, said coil means being connected in said circuit so that said contact means is actuated on the persistence of overload of a predetermined magnitude for a predetermined duration, said duration being inversely dependent on said magnitude, circuit interrupting means, means connected to said interrupting means for connecting said interrupting means to said supply means when actuated to interrupt the supply of power to said primary means, and means connecting said contact means to said interrupting means to actuate said interrupting means on actuation of said contact means, the relationship between said magnitude and said duration being such that said contact means is actuated only on the occurrence of a persistent overload and not during normal welding at the highest current rating of said apparatus.

9. Apparatus for supplying power from a polyphase source having $n$ phases, to a load including a transformer having a primary of $n$ sets of windings, a secondary of $n$ sets of windings and a core which becomes saturated on the flow of unbalanced current through said secondary, only $n-1$ overload relays each having coil means and contact means, first means including said $n-1$ coil means connecting the sets of windings of said primary in a first network corresponding to said source, each of said $n-1$ coil means being connected in said network to conduct current dependent on the current conducted by a different set of said sets of windings of said primary, second means connecting the sets of windings of said secondary in a second network corresponding to said source, current interrupting means, means connected to said first network and including said current interrupting means for connecting said source in polyphase power-transfer relationship with said first network, said interrupting means when actuated interrupting said power transfer, rectifier means of the silicon-diode type, means connecting said rectifier means in rectifying relationship with said second network, means connected to said rectifying means for connecting said rectifying means in direct-current power-transfer relationship with said load, and means connecting said contact means to said interrupting means so that an actuation of said contact means of any one of said relays and interrupting means is actuated.

10. Apparatus for supplying power from a polyphase source having $n$ phases to a load including a transformer having a primary of $n$ sets of windings, a secondary of $n$ sets of windings and a core which becomes saturated on the flow of unbalanced current through said secondary, only $n-1$ overload relays each having coil means and contact means, first means including said $n-1$ coil means connecting the sets of windings of said primary in a first network corresponding to said source, each of said $n-1$ coil means being connected in said network to conduct current dependent on the current conducted by a different one of said sets of windings of said primary, second means connecting the sets of windings of said secondary in a second network corresponding to said source, current interrupting means, means connected to said first network and including said current interrupting means for connecting said source in polyphase power-transfer relationship with said first network, said interrupting means when actuated interrupting said power transfer, power converting means, means connecting said converting means in power converting relationship with said second network, said converting means when defective producing an unbalance in the current flow through said secondary network, means connected to said converting means for connecting said converting means in converted power-transfer relationship with said load, and means connecting said contact means to said interrupting means so that an actuation of said contact means of any one of said relays and interrupting means is actuated.

References Cited in the file of this patent

UNITED STATES PATENTS

| | | |
|---|---|---|
| 1,765,264 | Finney | June 17, 1930 |
| 2,023,070 | Goldborough | Dec. 3, 1935 |
| 2,386,526 | Whitesell et al. | Oct. 9, 1945 |
| 2,866,147 | Bichsel | Dec. 23, 1958 |